United States Patent
Fleck et al.

[11] 3,880,841
[45] Apr. 29, 1975

[54] TRIAZOLYL ETHENYL PHENYLENE DERIVATIVES

[75] Inventors: Fritz Fleck, Bottmingen/Basel-Land; Hans Kittl; Hans-Rudolf Schmid, both of Riehen/Basel; Horst Schmid, Munchenstein/Basel-Land; Salvatore Valenti, Bottmingen/Basel-Land, all of Switzerland

[73] Assignee: Sandoz Ltd., Basel, Switzerland

[22] Filed: Mar. 13, 1972

[21] Appl. No.: 234,325

[30] Foreign Application Priority Data
Mar. 18, 1971 Switzerland.................. 4036/71

[52] U.S. Cl. .......... 260/240 CA; 106/137; 106/176; 117/33.5 R; 117/33.5 T; 252/301.2 W; 260/37 P; 260/37 R; 260/40 P; 260/40 R; 260/40 TN; 260/308 K; 260/465 K; 260/566 A; 260/926
[51] Int. Cl. ...................... C07d 55/02; C09b 23/14
[58] Field of Search .................. 260/240 D, 240 CA

[56] References Cited
UNITED STATES PATENTS
3,732,221   5/1973   Siegrist et al.................. 260/240 B
FOREIGN PATENTS OR APPLICATIONS
1,273,478   5/1972   United Kingdom

*Primary Examiner*—John D. Randolph
*Attorney, Agent, or Firm*—Gerald D. Sharkin; Richard E. Vila; Joesph J. Borovian

[57] ABSTRACT
The invention provides novel compounds of formula

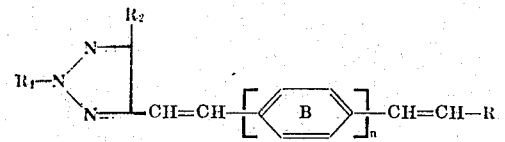

in which
R signifies a substituted or unsubstituted mono- or bi-nuclear aryl radical, or a radical of formula II,

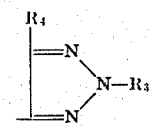

$R_1$ and $R_3$, which may be the same or different, each signifies a substituted or unsubstituted alkyl radical of 1 to 6 carbon atoms or mono- or bi-nuclear aryl radical,
$R_2$ and $R_4$, which may be the same or different, each signifies a hydrogen or chlorine atom, a substituted or unsubstituted alkyl radical of 1 to 6 carbon atoms, or a group —CN, —CONH$_2$, —COOR$_5$, in which $R_5$ signifies a hydrogen atom or an unsubstituted or substituted alkyl radical of 1 to 6 carbon atoms, or —NH-CO-R$_6$, in which $R_6$ signifies a substituted or unsubstituted alkyl radical of 1 to 6 carbon atoms,
$n$ signifies 1 to 6,
and the ring(s) B may be unsubstituted or substituted, provided that $n$ signifies other than 1, when R signifies a radical of formula II stated above useful as optical brighteners.

15 Claims, No Drawings

TRIAZOLYL ETHENYL PHENYLENE DERIVATIVES

This invention relates to novel triazolyl-ethenylphenylene derivatives.

More particularly, this invention provides compounds of formula I,

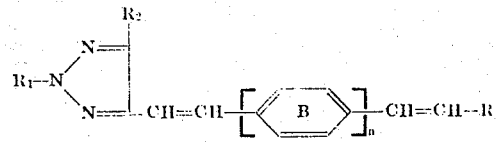

in which

R signifies a substituted or unsubstituted mono- or bi-nuclear aryl radical, or a radical of formula II,

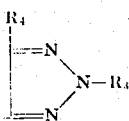

$R_1$ and $R_3$, which may be the same or different, each signifies a substituted or unsubstituted alkyl radical of 1 to 6 carbon atoms or mono- or bi-nuclear aryl radical, $R_2$ and $R_4$, which may be the same or different, each signifies a hydrogen or chlorine atom, a substituted or unsubstituted alkyl radical of 1 to 6 carbon atoms, or a group —CN, —$CONH_2$, —$COOR_5$, in which $R_5$ signifies a hydrogen atom or an unsubstituted or substituted alkyl radical of 1 to 6 carbon atoms, or —NH—CO—$R_6$, in which $R_6$ signifies a substituted or unsubstituted alkyl radical of 1 to 6 carbon atoms, $n$ signifies 1 to 6, and the ring(s) B may be unsubstituted or substituted, provided that $n$ signifies other than 1, when R signifies a radical of formula II stated above.

The invention also provides processes for the production of compounds of formula I, characterised by a. reacting an appropriate compound of formula III,

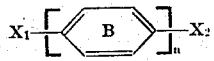

with a compound of formula IV and a compound of formula V,

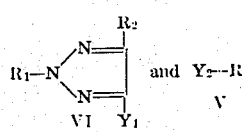

$n$, R, $R_1$, $R_2$ and the ring(s) B being as defined above, one of the radicals $X_1$ and $Y_1$, on the one hand, and $X_2$ and $Y_2$, on the other hand, signifying a group —CHO or a functional derivative thereof, and the other signifying a radical of formula VI,

—$CH_2$ - $Z_1$

VI in which $Z_1$ signifies a hydrogen atom, a carboxy group, a substituted or unsubstituted carboxylic ester or amido group or a group VII, VIII, IX, X or XI,

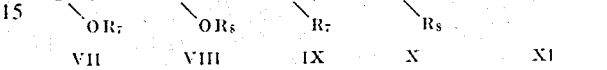

in which $R_7$ signifies a substitituted or unsubstituted aryl radical, $R_8$ signifies a substituted or unsubstituted alkyl radical of 1 to 6 carbon atoms, or an unsubstituted or substituted cycloalkyl radical, and, $A^\ominus$ signifies a monovalent anion, and, where required, converting into a hydrogen atom any $Z_1$ in the resulting product which is other than a hydrogen atom, or b. reacting an appropriate compound of formula XII,

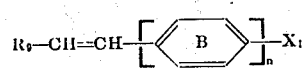

with a compound of formula XIII, $R_{10}$ - $Y_1$

XIII

$n$, $X_1$, $Y_1$ and the ring(s) B being as defined above, and one of $R_9$ and $R_{10}$ signifying R, as defined above, and the other signifying a radical of formula XIV,

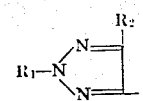

in which $R_1$ and $R_2$ are as defined above, and, where required, converting into a hydrogen atom any $Z_1$ in the resulting product which is other than a hydrogen atom, or c. producing a compound of formula Ia,

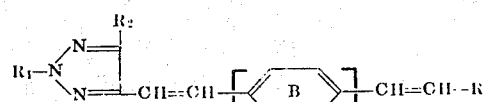

in which

R, $R_1$, $R_2$ and the ring(s) B are as defined above, and $n'$ signifies 2 to 6, by reacting a compound of formula XV,

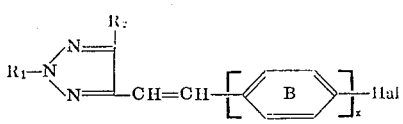

XV with a compound of formula XVI,

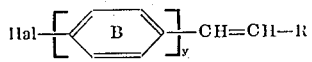

XVI

R, $R_1$, $R_2$ and the ring(s) B being as defined above,

Hal signifying a chlorine, bromine or iodine atom, and $x$ and $y$ each signifying 1 to 5, provided that the sum of $x$ and $y$ does not exceed 6, in the presence of copper powder, or d. reacting, in the presence of a catalyst, a diazo derivative of a compound of formula XVII,

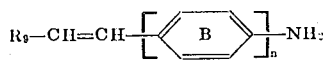

XVII with a compound of formula XVII, $$R_{10} - CH = CH - Z_2$$

XVIII $R_9$, $R_{10}$, $n$ and the ring(s) B as defined above, and $Z_2$ signifying a carboxyl, or a substituted or unsubstituted carboxylic acid amide or ester group, and, where required, splitting off $Z_2$ in the resulting product, or e. reacting a compound of formula XIX,

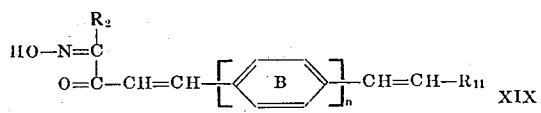

XIX in which $R_2$, $n$ and the ring(s) B are as defined above, and $R_{11}$ signifies a substituted or unsubstituted mono- or bi-nuclear aryl radical, or a radical of formula XX,

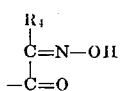

XX in which $R_4$ is as defined above, with a compound of formula XXI, $$R_1 - NH - NH_2$$

XXI in which $R_1$ is as defined above, and, when $R_{11}$ signifies a radical of formula XX, a compound of formula XXII, $$R_3 - NH - NH_2$$

XXII in which $R_3$ is as defined above, and cyclising the resulting product.

Process (a) is suitably carried out in the absence of air and at a temperature of from 0° to 200°C, preferably 20° to 160°C. The process may be carried out by simply melting the reactants but it is preferred to employ an inert organic solvent such as an aliphatic or aromatic hydrocarbon, a halogenated hydrocarbon, an alcohol, an ether, a glycol, formamide, dimethyl formamide or acetamide, N-methylpyrrolidone, acetonitrile, dimethyl sulphoxide, tetramethylene sulphone or hexamethyl phosphoric triamide.

It will be appreciated that the radicals attached to $Y_1$ and $Y_2$ in the compounds of formula IV and V may in fact be identical in which case a "symmetrical" product will be obtained. Where the compounds are identical, at least two moles are naturally preferably employed per mole of the compound of formula II. When the compounds of formula IV and V differ, at least 1 mole of each is preferably employed per mole of the compound of formula II. In this case, the product may comprise a mixture of "symmetrical" and "asymmetrical" products.

The process is preferably effected in the presence of conventional condensation agents or catalysts for such reactions, for example boric acid, zinc chloride, arylsulphonic acids, alkali and alkaline earth metal salts of arylculphonamides, acetic anhydride, piperidine, alkali metal acetates and alkali or alkaline earth metal hydroxides or alcoholates.

Where $Z_1$, is other than a hydrogen atom and is not removed during the reaction, it may be subsequently converted to a hydrogen atom in conventional manner.

Process (a) is particularly suitable for the production of symmetrical products.

Process (b) which is particularly suitable for the production of asymmetrical products, may be carried out in the same manner as process (a), described above.

Process (c) is suitably carried out at an elevated temperature, preferably from 150° to 250°C, more preferably from 200° to 220°C. The process is conveniently carried out under an inert atmosphere, e.g. nitrogen gas, and in the absence of moisture. This process is particularly suitable for symmetrical products, the compounds of formula XV and XVI preferably being identical. Equimolar amounts of the reactants are suitably used.

In process (d), the reaction of the diazo derivative of a compound of formula XVII with a compound of formula XVIII, is suitably carried out in a polar solvent, for example water, acetone, glacial acetic acid or pyridine, preferably a mixture of such solvents, and at a temperature of from −10° to 60°C, preferably 5° to 25°C. The catalyst may be any conventional catalyst for such reactions, e.g. copper, copper - bronze or cuprous or cupric chloride which may be employed in association with acetone. The preferred catalyst is cuprous chloride which is conveniently produced in situ by employing a mixture of copper or bronze and cupric chloride which slowly react to provide cuprous chloride. The process may advantageously be carried out in the presence of an alkali metal salt of a weak acid to buffer the reaction mixture in the weakly acid region. Suitable such salts include sodium acetate and monosodium phosphate or monosodium citrate alone or in admixture with the disodium salt. The reaction proceeds with evolution of nitrogen and, often, with simultaneous cleavage of the radical $Z_2$. As the reaction progresses and the nitrogen evolution grows weaker the product generally crystallises out and may be worked up in this form, if required after removal of acetone by distillation. Where required, the radical $Z_2$ in the resulting product may be cleaved in conventional manner. Equimolar amounts of the reactants are suitably used. Where $Z_2$ signifies a carboxy group, it may suitably be a carboxylic acid group or an alkali metal, e.g., potassium, salt thereof.

In process (e), the reaction of the compound of formula XIX with the compounds of formula XXI and XXII is conveniently effected in an inert, preferably polar, solvent, such as those employed in process (a) as described above, or in a lower alkane carboxylic acid, e.g. acetic or propionic acid. The process is, in any event, preferably carried out in the presence of an acid, e.g. a lower organic carboxylic acid, such as formic, acetic, propionic, butyric, oxalic, tartaric, lactic or citric acid. Equimolar amounts of the reactants are suitably used.

The cyclisation of the hydrazone intermediate formed, which may be separated and dried before cyclisation, is conveniently effected in the presence of a dehydrating agent, e.g., an anhydride or halide, preferably chloride of an organic carboxylic acid, e.g., acetic or propionic anhydride, or a phosphorous halide, e.g., phosphorous trichloride, oxychloride or pentachloride, and at a temperature of from 0° to 150°C, preferably 20° to 130°C. The process may, if desired, be carried out in an inert organic solvent, for example if an acid halide is employed as dehydrating agent. Suitable solvents include hydrocarbons, halogenated hydrocarbons, ethers, dimethyl formamide, acetamide or sulphoxide and tetramethylene sulphone. Alternatively, and where appropriate, an excess of the dehydrating agent, e.g., acetic anhydride may be employed to provide the reaction medium, if desired in the presence of a solvent such as dimethyl formamide.

Cyclisation may also be carried out by oxidation, whereby the triazole-N-oxide is initially formed and may be reduced to the triazole in conventional manner. Oxidative cyclisation may conveniently be carried out in the presence of a solvent which is unaffected by oxidising agents, e.g., water, amides, such as dimethyl formamide or acetamide, phosphoric tris-(dimethylamide), sulphones, such as tetramethylene sulphone, ethers, such as dioxane, 1,2-dimethoxyethane and 1,2-diethoxyethane, tertiary amines, such as dimethylamino-and diethylaminobenzene, triethylamine, tri-(n-butyl)-amine, pyridine, picoline, quinoline and mixtures of pyridine bases.

Suitable oxidising agents include bichromate, hydrogen peroxide, alkali metal hypohalogenites, preferably sodium hypochlorite or hypobromite; inorganic and organic copper (II) compounds, such as copper (II) chloride, sulphate, acetate, carbonate and naphthenate, preferably employed in the presence of nitrogenous bases, such as ammonia, amines, e.g. trimethylamine, ethanolamine, diethanolamine, triethanolamine and pyridine; air or oxygen in the presence of a copper (II) compound.

The oxidative cyclisation is conveniently effected at a temperature of from 40° to 150°C, when an alkali metal hypohalogenite is employed. When a copper (II) compound either alone or in conjunctiton with air or oxygen is employed, the cyclisation may suitably be effected at a temperature of from 80° to 130°C. For oxidation with air or oxygen, the copper (II) compound is conveniently used in catalytic amounts, preferably from 3 to 10% of the stoichiometric quantity, or in the stoichiometric amount or in excess thereof.

The subsequent reduction of the triazole-N-oxide formed may be effected in conventional manner, preferably using a mild reducing agent, such as zinc dust/acetic acid.

Cyclisation may also be carried out with urea and at a temperature of from 100° to 210°C, preferably 120° to 175°C, intermediate drying of the hydrazone not being necessary. The moist hydrazone may thus be simply added to a urea melt. Preferably, urea is used in an amount of from two to 20, more preferably three to 15 times the dry content of the hydrazone.

The resulting compounds of formula I may be isolated and purified using conventional methods, for example suction filtration, precipitation followed by suction filtration, evaporation of solvent and filtration of settled product.

The compounds of formula III, IV and V employed as starting materials in process (a), are either known or may be produced in conventional manner from available starting materials. Suitable functional derivatives of the aldehyde radical, which may be present in the compounds, include the oxime, hydrazone, azine or, preferably, anile radical. $R_7$, when present, is suitably a mononuclear aryl radical, and is more preferably substituted phenyl. When $R_8$ is present and signifies a cycloalkyl radical, it preferably signifies a cyclohexyl radical. $A^{\ominus}$, when present, may for example signify $Cl^{\ominus}$, $Br^{\ominus}$, $I^{\ominus}$, $CH_3OSO_3^{\ominus}$, $C_2H_5OSO_3^{\ominus}$ or $CH_3SO_3^{\ominus}$. When $Z_1$ signifies a carboxy group, it may suitably be a carboxylic acid group or an alkali metal, e.g. potassium, salt thereof.

The compounds of formula XII, employed as starting materials in process (b) may, for example, be produced by processes characterised by, f. producing a compound of formula XIIa,

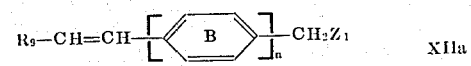   XIIa in which $R_9$, $n$, $Z_1$ and the ring(s) B are as defined above, by reacting a compound of formula XXIII,

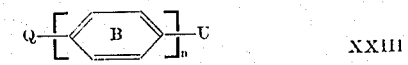   XXIII in which n, and the ring(s) B are as defined above, Q signifies a radical —CHO or a functional derivative thereof, and U signifies a radical convertible into a group —CH$_2$—Z$_1$, as defined above, with a compound of formula XXIV,

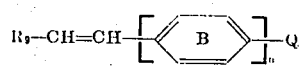

XXIV in which

R$_9$ and Z$_1$ are as defined above, and, where required, converting into a hydrogen atom, any Z$_1$ in the resulting product which is other than a hydrogen atom, and converting U, in the resulting product, to a radical —CH$_2$Z$_1$, as defined above, or g. producing a compound of formula XIIb,

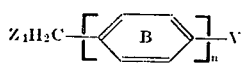

XIIb in which

R$_9$, Q, n and the ring(s) B are as defined above, by reacting a compound of formula XXV,

XXV in which

Z$_1$, n and the ring(s) B are as defined above, and

V is a radical convertible into a group Q, as defined above, with a compound of formula XXVI,

R$_9$ - Q

XXVI in which

R$_9$ and Q are as defined above, and, where required, converting into a hydrogen atom, any Z$_1$ in the resulting product which is other than a hydrogen atom, and converting V in the resulting product to a group Q, as defined above.

The first steps of processes (f) and (g) may be carried out in manner analogous to process (a) described above.

Suitable significances for U in the compounds of formula XXIII are well-known. Thus, for example, when, in the compounds of formula XIIa, Z$_1$ signifies a radical of formula VII or VIII, stated above, U may suitably signify the group —CH$_2$Br which may subsequently be converted to the desired — CH$_2$Z$_1$ radical by reaction with a trialkyl or triaryl phosphite.

Suitable significances and conversion techniques for V in the compounds of formula XXV are also well-known.

The compounds of formulae XIII, XIV, XV, XVI, XVII, XVIII, XIX, XXI, XXII, XIII, XXIV, XXV and XXVI employed as starting materials are also known or may be produced in conventional manner from available starting materials. When, in the compounds of formula XIX, R$_2$ and/or R$_4$ signify a hydrogen atom they may be converted into a chlorine atom by treatment with hydrogen chloride, suitably in a solvent, such as an alcohol or ether, e.g. ethanol, propanol, butanol, methylglycol, ethylglycol, ethylene glycol, diethyleneglycol or dioxan, and at a temperature close to the boiling point of the solvent.

In the compounds of formula I, the ring(s) B may, as indicated, be substituted, particularly when n signifies 1 or 2. Thus, for example, when n signifies 1, the ring B may, for example, bear one or more of the following substituents: aryl sulphonyl, preferably mononuclear, e.g. phenylsulphonyl, methylphenylsulphonyl, chlorophenylsulphonyl; aryl or aryloxy substituted by halogen, or alkyl or alkoxy of 1 to 6 carbon atoms, the aryl radical preferably being mononuclear, particularly phenyl; alkyl or alkoxy of 1 to 6 carbon atoms, e.g. methyl, ethyl, n-propyl, iso-propyl, n-butyl, isobutyl, t-butyl, n-aryl, t-amyl, iso-amyl, sec-amyl, n-hexyl, methoxy, ethoxy or n-butoxy; halogen, e.g. chlorine or fluorine; cyano, carboxyl or sulphonic acid; substituted or unsubstituted carboxylic or sulphonic acid amide or ester; alkyl sulphonyl of 1 to 6 carbon atoms.

Further, when n signifies 2, the rings B may, for example, be substituted by one or more of the following substituents: halogen, e.g. chlorine or fluorine; alkyl of 1 to 6 carbon atoms, e.g. methyl or ethyl; cyano; carboxylic or sulphonic acids or amides or ether thereof; alkyl or aryl sulphonyl.

Preferably, each ring B contains no more than two substituents.

Suitable aryl radicals for R$_1$, R$_3$ and R include radicals of the diphenyl or benzene series which may, for example, be substituted by substituents described above for the ring(s) B. Suitable alkyl radicals for R$_1$ to R$_4$ include those described above for nucleus B and suitable substituted alkyl radicals include those in which the substituent is alkoxy of 1 to 6 carbon atoms, amino, halogen, e.g. fluorine or chlorine. However, the alkyl radicals of R$_1$ to R$_4$ are preferably unsubstituted.

The preferred compounds of formula I are those of formula Ib,

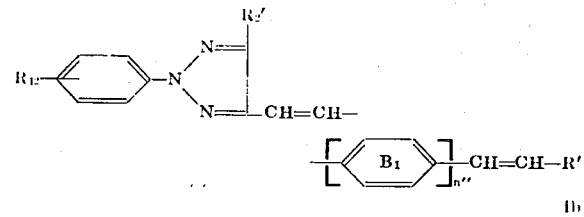

Ib in which

R' signifies a radical of formula IIa,

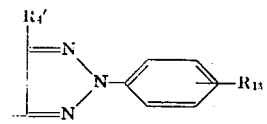

IIa or of formula XXVII,

XXVII

R$_2$' and R$_4$', which may be the same or different, each signifies a hydrogen or chlorine atom, or a methyl radical, R₁₂ and R₁₃, which may be the same or different, each signifies a hydrogen atom or an ortho- or paracyano radical, R₁₄ signifies a chlorine atom, a —CONH₂ group, a para-phenyl group, or an ortho- or paracyano group, and n" signifies 1 to 4, and, when n" signifies 1, the ring B₁ may be substituted by a cyano radical, and, when n" signifies other than 1, each ring B₁ which is directly bonded to an ethenyl group may be substituted by a cyano group in a position ortho to the respective ethenyl group, provided that when R' signifies a radical of formula IIa, n" is other than 1 and that when R' signifies a radical of formula XXVII, n" is other than 4.

In the compounds of formula Ib, each ring B₁ which is directly bonded to an ethenyl group, is preferably unsubstituted or substituted by a single cyano group.

The compounds of formula I are useful as optical brighteners. In particular they may be used for the optical brightening of textiles and non-textile organic materials and plastics. "Organic materials" is intended to include not only natural fibres, such as cotton and wool, but also, and primarily, synthetic or semi-synthetic fibre-forming polymers, e.g. polyesters, polyurethanes, polyolefines (e.g. polyethylene, polypropylene), polyvinyl acetate, polyvinylchloride, polyvinylidene chloride, polyacrylonitrile, modified polyacrylonitrile, cellulose (2 ½) acetate, cellulose triacetate, polystyrene and polyamides.

The compounds of formula I may be applied in conventional manner, for example, from solutions or suspensions in organic solvents or from dispersions in water. They may also conveniently be incorporated into spinning solutions and melts, plastic moulding materials and in monomers and prepolymers for the synthesis of polymers.

The compounds may be applied in amounts of, for example, from 0.001 to 0.5 percent, preferably 0.01 to 0.2 percent, based on the weight of the material to be brightened and depending on the method of application. The compounds may be applied alone or in combination with other optical brighteners, and, if desired, in the presence of chemical bleaching agents and surface active agents, such as detergents, and carriers.

In relation to known compounds such as those described in French Pat. No. 1,576,018, Belgian Patent 751,417 and German Patent application 2,025,792, the compounds of formula I exhibit interesting properties, particularly light and wash fastness, neutrality of shade and low degree of sublimation, especially when applied to polyester fibres.

In the following Examples, all parts and percentages are by weight, the temperatures are in °C, the melting points are uncorrected and the absorption maxima are, unless otherwise indicated, in chloroform.

EXAMPLE 1 [process a)]

8.5 Parts of 4,4'-bis-(diethoxyphosphonomethyl)-diphenyl and 5 parts of 2-phenyl-4-formyl-triazole are dissolved in 33 parts of dimethyl formamide. The solution is dropped at 40–45° into a suspension of 10 parts of potassium hydroxide powder (12 percent water content) in 47 parts of dimethyl formamide, with cooling to ensure that the temperature does not rise to above 50°–55°. The reaction mixture is stirred for 2 hours at 40°–45°, then 250 parts of water are added, and the mixture poured into 104 parts of 2N hydrochloric acid. The yellow precipitate is filtered with vigorous suction, washed with water and then with methanol, and vacuum dried at 80°. Pale yellow crystals are obtained in the yield of 6.97 parts, which is 97% of theory. After recrystallization from 187 parts of ortho-dichlorobenzene with the aid of bleaching earth, the crystals melt at 223–226° and fluoresce with a violet shade in chlorobenzene solution. The compound has the formula

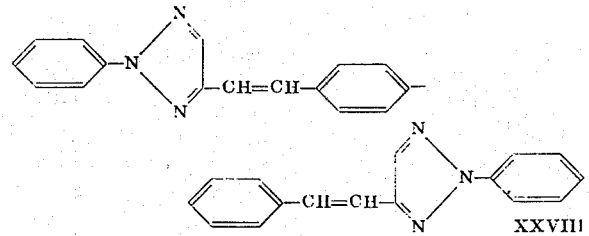

XXVIII (maximum absorption 355 nm, maximum emission 430 nm).

The known compound 4,4'-bis-(diethoxyphosphonomethyl)-diphenyl of formula

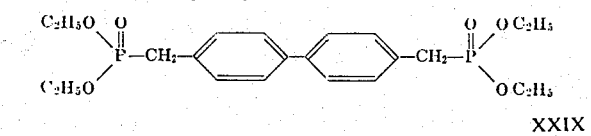

XXIX is readily accessible by the process described in Belgian Patent No. 721,754.

EXAMPLE 2 [process a)]

20 parts of 4,4'-bis-(diethoxyphosphonomethyl)-diphenyl and 12 parts of 2-(4'-cyanophenyl)-triazole-4-aldehyde are dissolved in 95 parts of anhydrous dimethyl formamide with thorough stirring. A solution of 10 parts of sodium methylate in 28 parts of methanol is added dropwise with cooling so that the temperature does not increase beyond 50°. Stirring is continued for 4 hours 40°–50°. On cooling the reaction product settles out. It is filtered with suction, washed with methanol and water, and recrystallized from ortho-dichlorobenzene in the presence of bleaching earth. Pale yellow crystals of the compound of formula

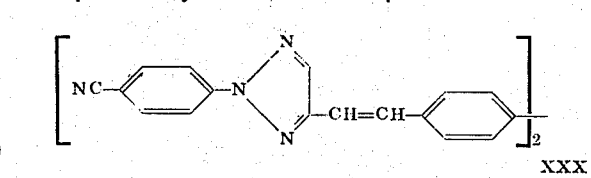

XXX are obtained in a yield of 7.2 parts (45 percent of theory). The melting point is 319°–320°, the fluorescence shade in ortho-dichlorobenzene solution violet, and the absorption maximum 372 nm.

EXAMPLE 3 [process a)]

A solution of 8.5 parts of 4,4'-bis-(diethoxyphosphonomethyl)-diphenyl and 7 parts of 2-phenyl-4-methyl-5-formyltriazole in 40 parts of anhydrous dimethyl formamide is prepared, to which is added dropwise 20 parts of 30 percent sodium methylate solution. The operating procedure is as given in Example 2 and it results in pale yellow crystals of formula

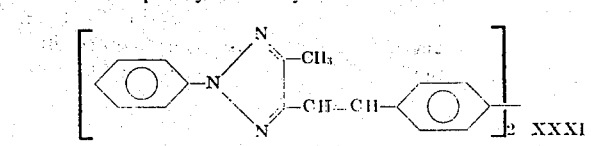

XXXI which melt at 232°–234°, show violet fluorescence in chlorobenzene solution and maximum absorption at 370 nm.

ing point of this compound is 232°–235°, its fluorescence shade in chlorobenzene solution is reddish violet and it has the formula

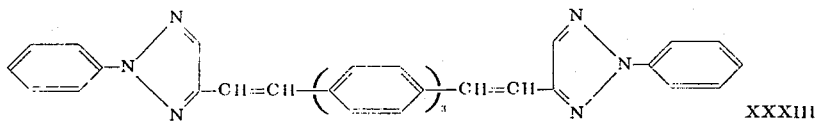 XXXIII

EXAMPLE 4 [process a)]

20 Parts of 4,4'-bis-(diethoxyphosphonomethyl)-3,3'-dicyanodiphenyl and 14.6 parts of 2-phenyl-triazole-4-aldehyde are dissolved in 120 parts of dry dimethyl formamide. A solution of 10 parts of sodium methylate in 28 parts of methanol is added dropwise. The further procedure is as described in Example 2. After recrystallisation, yellow crystals are obtained having the formula

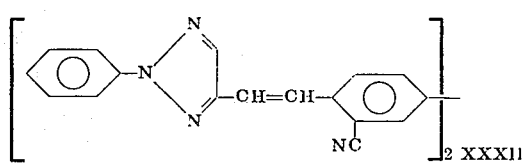 XXXII

The melting point of the crystals is 262°–264°, the absorption maximum is at 370 nm. In chlorobenzene solution they exhibit intense blue fluoresence.

EXAMPLE 5 [process a)]

34.7 Parts of the thoroughly dried dipotassium salt of 4,4'-diphenylene diacetic acid and 34.6 parts of 2-phenyl-1,2,3-triazole-4-aldehyde are well mixed with 40.8 parts of freshly distilled acetic anhydride, 1 part of freshly distilled pyridine and 10 parts of freshly calcined and pulverised potassium carbonate. The mixture is rapidly heated with stirring in an oil bath previously raised to 180°. After the end-point of the main reaction has been reached, the mixture is stirred further for 4 hours at 180°–190°, than 1,150 parts of 30% hydrochloric acid are added and stirring continued for 30 minutes at about 90°. When the mixture is cooled the reaction product is filtered, washed free of acid and dried. It is entered into 110 parts of hot quinoline, to which 5 parts of copper powder ("Venus Copper 55 UP") are added, and stirred for several hours at increasing temperature from 150° to 200°, during which time decarboxylation takes place. The compound is purified by recrystallisation from ortho-dichlorobenzene with the aid of bleaching earth. An almost colourless compound is obtained which shows red-violet fluorescence in chlorobenzene solution and agrees with formula XXVIII.

EXAMPLE 6 [process a)]

If 42.3 parts of the dipotassium salt of 4,4'-p-terphenylene-diacetic acid are used in Example 5 instead of 34.7 parts of the dipotassium salt of 4,4'-diphenylene diacetic acid and the reaction procedure of the Example followed, 4,4''-bis-(2-phenyl-1,2,3-triazolyl-4-ethenyl)-p-terphenyl is obtained in the form of pale lemon crystals on recrystallisation from trichlorobenzene using bleaching agent as assistant. The melting point of this compound is 232°–235°, its fluorescence shade in chlorobenzene solution is reddish violet and it has the formula

EXAMPLE 7 [process a)]

If the 34.7 parts of the dipotassium salt of 4,4'-diphenylene-diacetic acid used in Example 5 are replaced by 49.8 parts of the dipotassium salt of 4,4'''-quaterphenylene-diacetic acid, in an analogous manner 4,4'''-bis-(2-phenyl-1,2,3-triazolyl-4-ethenyl-p-quaterphenyl of formula

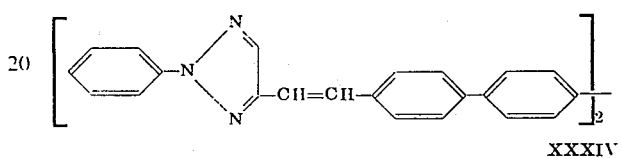 XXXIV is obtained in the form of a pale lemon-coloured powder.

The dipotassium salts named in Examples 5, 6 and 7 can be the obtained in good yield from the p,p'-diacetyl derivatives by the Willgerodt-Kindler reaction, the reaction with sulphur being carried out to best advantage in excess morpholine. The thiomorpholide formed is in each case converted directly into the dipotassium salt by saponification with 40–50 percent potassium hydroxide solution (see W. A. Cummings & K. Whittaker, J. Applied Chem. 12, 2, 86–90 (1962) and C. G. Joshi & J. L. Bose, J. Sci. Ind. Research (India) 21B, 6, 284 (1962) ).

EXAMPLE 8 [process a)]

56.8 Parts of 4,4''-bis-(bromomethyl)-terphenyl are suspended in 500 parts of xylene. A solution of 39.6 parts of triethyl phosphite in 170 parts of xylene is added slowly at boiling temperature with stirring. The reaction mixture is held at the boil for 20 hours with reflux, after which time a further solution of 39.6 parts of triethyl phosphite in 170 parts of xylene is added dropwise and boiling continued for 20 hours. On cooling the product settles out and is isolated by filtration and dried. It has the formula

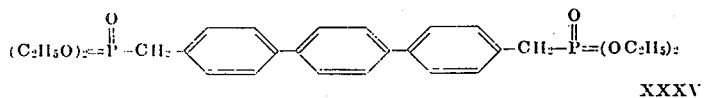 XXXV and melts at 145°–147°. The compound can be reacted further in the succeeding stage without additional purification.

If in place of 56.8 parts of 4,4''-bis-(bromomethyl)-terphenyl, 67.2 parts of 4,4'''-bis-(bromomethyl)-quaterphenyl are employed, proceeding as above the compound of formula

 XXXVI is obtained in comparably good yield.

33.2 Parts of the compound of formula (XXXV) are suspended in 800 parts of dimethyl formamide. At room temperature and with stirring in a nitrogen atmosphere, 14 parts of sodium methylate are added, followed by a solution of 22 parts of 2-phenyl-1,2,3-triazole-4-aldehyde in 500 parts of dimethyl formamide. The reaction mixture is stirred for 1 hour at room temperature, then raised to 70°–80° and held at this temperature for 3 hours. After cooling the entire mixture is unloaded into about 200 parts of ice-water, on which the reaction product is precipitated. It is filtered with suction, washed well with water and dried. It is obtained in very good yield and agrees with formula XXXIII.

If in place of 33.2 parts of the compound of formula (XXXV) 38 parts of the compound of formula (XXXVI) are used and the foregoing procedure followed, the compound of formula (XXXIV) is obtained in good yield.

EXAMPLE 9 [process a)]

33.2 Parts of the compound of formula (XXXV) are suspended in 800 parts of dimethyl formamide. At room temperature and with stirring in a nitrogen atmosphere, 14 parts of sodium methylate are slowly added, followed by a solution of 25.2 parts of 2-p-cyanophenyl-1,2,3-triazole-4-aldehyde in 500 parts of dimethyl formamide. The mixture is stirred for 1 hour at room temperature, then raised to 70°–80° and held at this temperature for 3 hours. After it has cooled it is run with stirring into about 200 parts of ice-water. The precipitated reaction product is filtered with suction, washed well with water, dried, and purified by recrystallisation from o-dichlorobenzene with the aid of bleaching earth. The compound of formula

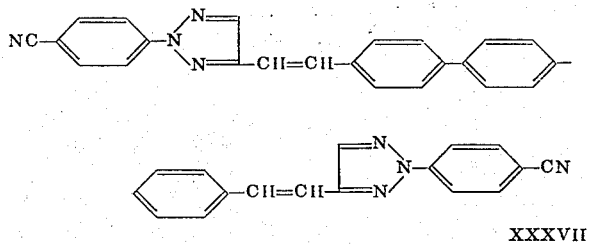

XXXVII is obtained in very good yield in the form of a pale yellow powder with melting point 328–330° and an absorption maximum at 365 nm.

EXAMPLE 10 [process a)]

A suspension of 47.6 parts of the compound of formula

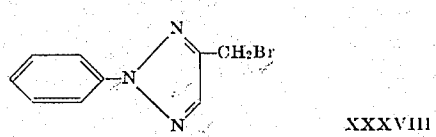

XXXVIII in 300 parts of xylene is prepared, to which is added slowly at boiling temperature and with stirring a solution of 30 parts of triethyl phosphite in 140 parts of xylene. The reaction mixture is maintained at the boil for 20 hours with reflux. A further solution of 30 parts of triethyl phosphite in 140 parts of xylene is dropped in after this period, then boiling is resumed for 20 hours. After cooling the precipitated product is filtered with suction and dried. The compound of formula

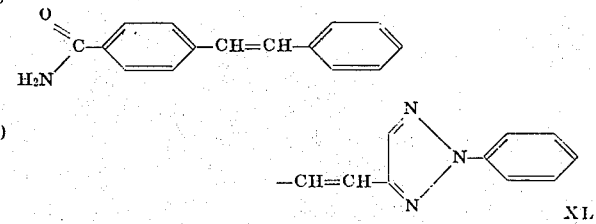

XXXIX is obtained, which can be reacted further without additional purification.

59 Parts of the compound of formula XXXIX are suspended in 1400 parts of dimethyl formamide. In a nitrogen atmosphere 22 parts of sodium methylate are slowly added at room temperature with stirring, followed by a solution of 28.6 parts of 4,4''-p-terphenyl dialdehyde in 650 parts of dimethyl formamide. The reaction mixture is stirred for 1 hour at room temperature, then heated to 70°–80° and held for 3 hours at this temperature. On cooling it is unloaded into about 4000 parts of ice-water with stirring. The precipitate is filtered with suction, washed well with water and dried. The compound of formula XXXIII is obtained in good yield. If in place of 28.6 parts of 4,4''-p-terphenyl dialdehyde 36.2 parts of 4,4'''-p-quaterphenyl dialdehyde are employed in the aforegoing procedure, the compound of formula XXXIV is obtained in good yield.

EXAMPLE 11 [process b)]

50 Parts of 4-cyano-4'-methylstilbene, 60 parts of 2-phenyltriazole-4-aldehydanile and 110 parts of potassium hydroxide powder are di-solved in 1,420 parts of dimethyl formamide. The solution is raised to 90° in the course of 1 hour, stirred for a further hour at 90°–95° and then cooled to 20°, at which temperature 1,000 parts of water are dropped in, followed by 1,570 parts of 10 percent hydrochloric acid. The precipitated yellow product is filtered, washed with a total of 1,500 parts of water and 1050 parts of methyl alcohol, and dried at 80° with vacuum.

Yellow crystals are obtained in a yield of 50 parts (58 percent of theory), which on recrystallisation from 2-ethoxyethanol/activated carbon melt at 270°–273° and fluoresce with a blue-violet shade in chlorobenzene solution (absorption maximum nm). In the reaction the cyano group is hydrolysed to the aminocarbonyl group, hence the final compound agrees with the formula

XL

EXAMPLE 12 [process d)]

28.7 Parts of 4-amino-2-cyano-β-(2'-phenylosotriazolyl)-styrene are thoroughly mixed with 53 parts of glacial acetic acid, 26 parts of 36 percent hydrochloric acid, 40 parts of ice and 30 parts of water. In the space of 6 hours a solution of 7 parts of sodium nitrite in 20 parts of water is dropped into the mixture, the temperature being maintained at 0°–5° during this time. The yellow crystalline slurry is stirred further for 8–10 hours at 0°–5°. Then a solution of 16 parts of cinnamic acid in 200 parts of acetone is added with good stirring, after which the pH of the reaction mixture is adjusted to 3 - 3.5 with about 33 parts of 30 percent sodium hydroxide solution. In the course of the following 5 hours 10 parts of an equimolecular mixture of copper and copper (II) chloride are added. When the evolution of gas has ceased the temperature of the reaction mixture is allowed to increase to 20°, the acetone is distilled in vacuum, the precipitated product filtered, washed with water and vacuum dried at 60°. The crude product, which is obtained in a yield of 35 parts, is purified by chromatography on aluminium oxide and subsequent recrystallisation from ethanol.

The final compound in the form of lemon crystals has its melting point at 149°–151°, shows red-violet fluorescence in chlorobenzene solution (absorption maximum at 368 nm in CHCl₃) and has the formula

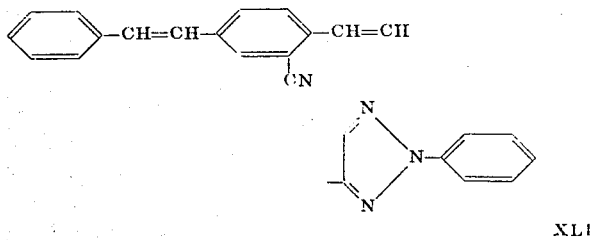

XLI

EXAMPLE 13 [process d)]

14.3 Parts of 4-amino-2-cyano-β-(2'-phenylosotriazolyl)-styrene, 32 parts of glacial acetic acid and 16 parts of 30% hydrochloric acid and 15 parts of water are stirred vigorously for 2 hours to give an intimate mixture. In the space of 4 hours a solution of 3.5 parts of sodium nitrite in 7 parts of water is added in portions, the reaction mixture being kept at a controlled temperature of 0°–5° during the addition. The yellow crystalline slurry is stirred for a further 5 hours at this temperature, than a solution of 12 parts of 4-phenylcinnamic acid in 100 parts of pyridine and 120 parts of acetone is added in one charge and the pH value adjusted to 4–6 with 30 percent sodium hydroxide solution. With continued thorough stirring, 5 parts of an equimolecular mixture of copper and copper (II) chloride are added in portions at 0° in the course of 6 hours. When the evolution of gas has ceased the cooling system is detached, the reaction mixture raised to 30°–40° in a water bath and the actone distilled with vacuum. The residue is run into 100 parts of water, the brown-yellow precipitate filtered with suction and vacuum dried at 80°. The crude product is dissolved in ortho-dichlorobenzene, filtered free of undissolved material, chromatographed on aluminium oxide (eluated with toluene/ethyl acetate 4:1) and recrystallised from 2-ethoxyethanol. Yellow crystals are obtained which fluoresce in chlorobenzene solution with a blue-violet shade and conform to the formula

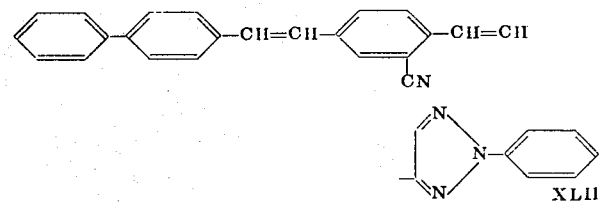

XLII

EXAMPLE 14 [process d)]

If the procedure of Example 12 is operated with the 16 parts of cinnamic acid replaced bz 19.7 parts of para-chlorocinnamic acid, a compound is obtained in the form of lemon crystals with melting point 153°–155°. It has a red-violet fluorescence shade in chlorobenzene solution, the absorption maximum in CHCl₃ is at 369–370 nm and its formula is

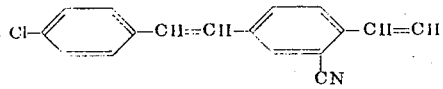

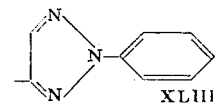

XLIII

EXAMPLE 15 [process c)]

A mixture of 9.9 parts of 4-iodo-2-cyano-β-(2'-phenylosotriazolyl)-styrene and 5 parts of copper powder ("Venus Copper") is reacted in a nitrogen current with stirring in the absence of moisture for 1 hour at 185°–190° and 5 hours at 190°–215°. After this time a thin layer chromatogram shows that no further starting material is present.

The melt is allowed to cool, then finely pulverised and exhaustively extracted in a heated extraction apparatus with white spirit, i.e., a terpenaline-alkane mixture, boiling range 150°–190°. After evaporation of the solvent, the extract is dissolved in methylene chloride, chromatographed on a silica gel column and finally recrystallized from benzene. The pale yellow product obtained is of formula XXXII, has its melting point at 261°–264° and fluoresces in solution with an intense blue-violet shade (absorption maximum at 370 nm in CHCl₃).

The 4-iodo-2-cyano-β-(2'-phenylosotriazolyl)styrene of formula

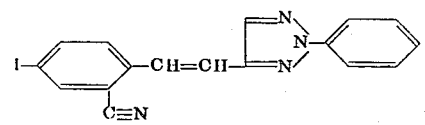

XLIV used as intermediate can be produced as follows.

18.1 Parts of 4-amino-2-cyano-β-(2'-phenylosotriazolyl)-styrene are dissolved in 150 parts of β-ethoxyethanol and 18.4 parts of dimethyl formamide. With thorough stirring, a solution of 16.7 parts of 36% hydrochloric acid in 65 parts of water and 50 parts of ice-water is added, then in the course of 1 hour a solution of 6.2 parts of sodium nitrite in 20 parts of water is dropped in at 0°–5°. The mixture is stirred further for 5 hours at 5°–10°. Subsequently a solution of 10.5 parts of potassium iodide in 15 parts of water is dropped in at the same temperature in about 30 minutes, with stirring which is continued for 2 hours at 18°–20° after the addition. The reaction mixture is allowed to stand overnight and finally is held for 1 hour at 60°–75° for complete cleavage of the nitrogen. It is unloaded into 500 parts of cold water and the precipitated 4-iodo-2-cyano-β-2'-phenylosotriazolyl)-styrene filtered with suction and dried with vacuum. Following recrystallisation from 1,500 parts of alcohol in the presence of 8 parts of activated carbon, the yellowish product melts at − 149°.

EXAMPLE 16 [process b)]

68 Parts of the compound of formula

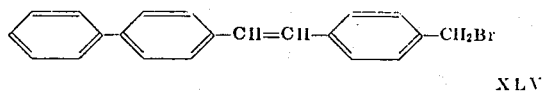

XLV and 54.4 parts if triphenylphosphine are added to 1,000 parts of dimethyl formamide and heated at 80° for 3 hours with stirring. A clear solution is formed, which is set with 34 parts of 2-phenyl-1,2,3-triazole-4-aldehyde and 21.2 parts of sodium methylate and held at 80° for a further 4 hours with continued stirring. The reaction mixture is then cooled, the precipitated product isolated by filtration, washed well with water and dried. It is recrystallized from benzene, on which the compound of formula

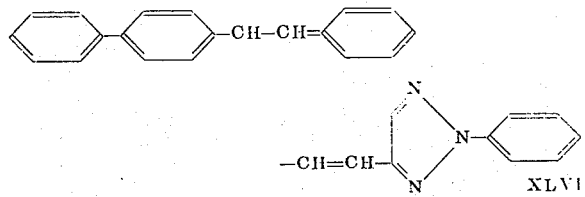
XLVI is obtained is good yield as a pale yellow powder with melting point 265°–266° (absorption maximum in CHCl₃: 374 nm).

EXAMPLE 17 [process b)]

If 39 parts of 2-(4'-cyanophenyl)-triazole-4-aldehyde are used in Example 16 in place of 34 parts of 2-phenyl-triazole-4-aldehyde, the procedure of that Example leads to yellow crystals which exhibit intense blue fluorescence in chlorobenzene solution. This compound has the formula

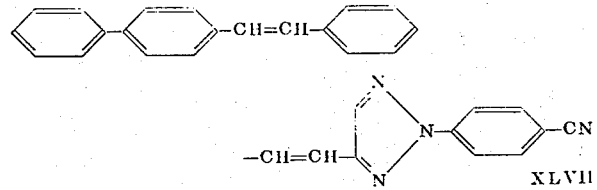
XLVII

EXAMPLE 18 [process b)]

20 Parts of 4-cyano-4'-diethoxyphosphonomethyl-stilbene and 9.8 parts of 2-phenyl-triazole-4-aldehyde are dissolved in 80 parts of anhydrous dimethyl formamide with vigorous stirring and the solution set with 14 parts of 30 percent sodium methylate solution at room temperature. It is stirred for 30°–40° for 1 hour, cooled, and the yellow precipitate filtered. After washing with ice-cold methanol and recrystallisation from chlorobenzene with the aid of bleaching earth, lemon-coloured crystals are obtained with melting point 204°–206° which show intense violet fluorescence in chlorobenzene solution (absorption maximum in CHCl₃: 372 nm). The crystalline product has the formula

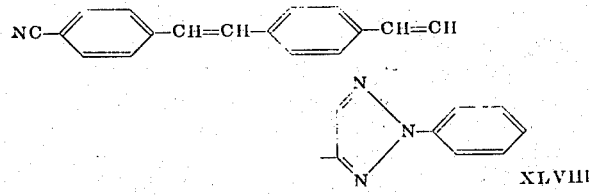
XLVIII

If the compound of formula LX of Example 11 is treated with phosphorous oxychloride for 2 hours at boiling temperature with reflux, again the compound of formula XLVIII is obtained.

EXAMPLE 19 [process b)]

If 11 parts of 2-(4'-cyanophenyl)-triazole-4-aldehyde are used in Example 18 in place of 9.8 parts of 2-phenyl-triazole-4-aldehyde and the procedure of that Example is employed, deeply coloured yellow crystals are obtained with melting point 266°–268°, which fluoresce with a blue-violet shade in ortho-dichlorobenzene solution (absorption maximum in CHCl₃: 372 nm) and are of formula

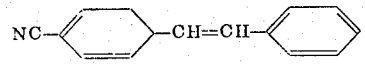

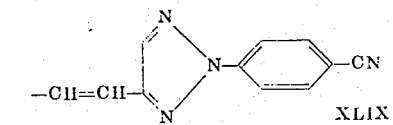
XLIX

EXAMPLE 20 [process b)]

If 10.6 parts of 2-phenyl-4-methyl-triazole-5-aldehyde are used in Example 18 in place of 9.8 parts of 2-phenyl-triazole-4-aldehyde, emplozing otherwise the same procedure, pale yellow crystals are obtained which melt at 187°–189°, show violet fluorescence in chlorobenzene solution (absorption maximum in CHCl₃: 375 nm) and have the formula

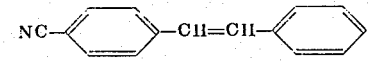

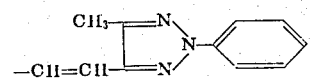
L

The 4-cyano-4'-diethoxyphosphonomethyl stilbene of formula

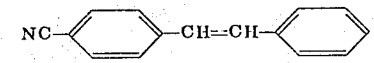

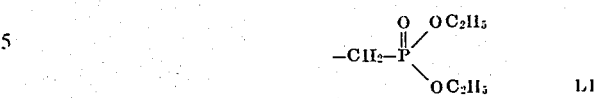
LI employed in Example 18 is obtained by reaction of 10 parts of 4-cyano-4'-bromoethyl stilbene, melting point 140°–142°, in 50 parts of triethyl phosphite for 6 hours with reflux, followed by vacuum distillation of the excess triethylphosphite, the addition of 10 ml of toluene and distillation of the triethyl phosphite in vacuum azeotropically with the toluene. The oily 4-cyano-4'-diethoxyphosphonomethyl stilbene can be used further as obtained without additional purification.

EXAMPLE 21 [process b)]

If 20 parts of 2-cyano-4'-diethoxyphosphonomethyl stilbene are used in Example 18 in place of 20 parts of 4-cyano-4'-diethoxyphosphonomethyl stilbene, the reactants dissolved in 52 parts of anhydrous, freshly distilled dimethyl formamide and reacted for 1 hour at 50°–60°, using otherwise the same procedure, again lemon-coloured crystals are obtained with melting point 177°–179°. They fluoresce with a red-violet shade in chlorobenzene solution (absorption maximum in CHCl₃: 368 nm) and are of formula

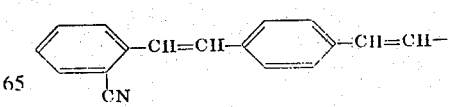

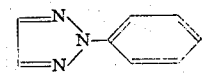
LII

EXAMPLE 22 [process b)]

If the procedure of Example 21 is practised using 11 parts of 2-(4'-cyanophenyl)-triazole-4-aldeyde instead of 9.8 parts of 2-phenyl-triazole-4-aldehyde, yellow crystals are obtained. These are of formula

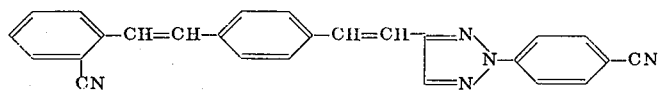

LIII melt at 218°–220° and exhibit violet fluorescence in chlorobenzene solution.

The 2-cyano-4'-diethoxy-phosphonomethyl stilbene used in Example 21 is produced as follows.

6.8 Parts of 2-cyano-4'-bromomethyl stilbene, melting point 108°–111°, are dissolved in 30 ml of benzene. A mixture of 20 parts of benzene and 10 parts of triethyl phosphite is added with stirring and careful heating. The reaction mixture is held at refluxing temperature for 4 hours, then the benzene and the excess triethyl phosphite are distilled and the residual brownish oil used further in the crude state.

The 2-phenyl-4-formyl-v-triazole used in several of the above Examples is produced by the method given by J. L. Riebsomer and D. A. Stauffer in J. Org. Chem. 16, 1643 (1956).

The 2-(4'-cyanophenyl)-v-triazole-4-aldehyde was synthesised in analogy with the methods of A. Jonas and H. v. Pechmann, Ann. 262, 277–302 (1891) and H. v. Pechmann and K. Wehsarg, Ber. 21, 2992 (1888) from di-iso-nitrosoacetone and 4-cyanophenylhydrazine. It is obtained as almost white crystals, melting point 167°–170°, absorption maximum (CHCl$_3$) : 292 nm.

2-Phenyl-4-methyl-v-triazole carboxylic acid-(5) (A. Jonas and H. v. Pechmann, Ann. 262, 277–302 (1891) ) is converted into 2-phenyl-4-methyl-5-formyl-v-triazole via the hydrazide and subsequent oxidation with lead tetracetate by the method of L. Vargha and M. Remenyi, J. Chem. Soc. (1951), 1068.

Application Example A

Two parts of the compound of formula XLI, 2 parts of a highly sulphonated castor oil and 8 parts of sodium dioctylphenyl polyglycol etheroxyacetate containing 40 ethenoxy groups in the molecule are mixed in 80 parts of water. The mixture is ground in suitable equipment, e.g. a sand mill, until the major size fractions of the particles is in the range of 0.5 to 2 microns. A bath is set at 50° with 3000 parts of water, 15 parts of a commercial carrier, e.g. ortho-dichlorobenzene, and 2 parts of the aforedescribed dispersion. 100 Parts of a fabric of polyester (polyethylene terephthalate) fibre are entered, the bath brought to the boil in 30 minutes and held at this temperature for 45 minutes with reflux. The fabric is then treated for 10 minutes in a fresh bath at 70° (goods to liquor ratio 40:1) containing 1.5 g/l octylphenyl decaglycolether, and on removal is rinsed with warm water and dried. The polyesther fabric exhibits an intense optical white. If enclosed machines operated at 120°–130° are employed, comparable white effects are obtainable without addition of a carrier.

Similar effects are achievable with one of the compounds of formula XLVIII, XLIX, L, LII or LIII.

Application Example B

20 Parts of a dispersion prepared as in Application Example A and containing as active substance the compound of formula XL are dispersed in 1000 parts of water. The dispersion is padded on a polyester fabric at room temperature and an expression giving an 80 percent increase on the dry weight. The fabric is dried for 30 minutes at 60° and the brightener fixed for 1 minute in dry heat at 220°. A pronounced white showing red-violet fluorescence is obtained.

This method is of course also suitable for brightening polyester fibres synthesized by condensation polymerisation of terephthalic acid with 1,4-dimethylol cyclohexane and fibres of polyethylene terephthalate.

Optical brightening effects of similar intensity are obtainable with dispersions containing an active substance corresponding to formula XLI, XLIII, XLVIII, XLIX, L, LII or LIII in place of the stated dispersion.

Application Example C

A charge of 200 parts of polyethylene terephthalate is melted in a melt spinning machine at 280° under a nitrogen atmosphere, and 0.4 parts of the compound of formula XXX are stirred into the melt until homogeneously mixed. 4 Parts of titanium dioxide are added as deulstrant, with continued stirring to ensure homogeneous distribution. The melt is extruded as filament, which is cooled with a jet of water, drawn, and wound on bobbins. Textiles made of this filament have a considerably higher degree of whiteness than comparable goods of filament without an incorporated brightener.

If the aforesaid compound is replaced by one of the compounds of formulae XXVIII, XXXI, XXXII, XXXIII, XXXIV, XXXVII, XL, XLI, XLII, XLVI, XLVII, XLVIX or L, similar white effects are obtained.

Application Example D

A batch of 1000 parts of dimethyl terephthalate, 665 parts of ethylene glycol, 0.55 parts of manganese acetate, 0.18 parts of antimony trioxide and 0.6 parts of one of the compounds of formulae XXX or XL is reacted with heating in a stainless steel autoclave fitted with a stirrer and a descending cooler. Cleavage of the methanol begins at about 160° and takes 2 ½ hours to complete. Towards the end of this time the temperature increases to about 225°. 4 Parts of titanium dioxide and 0.3 parts of phosphoric acid are added to the melt, the pressure inside the reaction vessel is reduced to below 1 mm and the temperature held at 290° until the desired degree of polymerization is reached. The polymer is extruded as filament at an excess pressure of 2–5 atmospheres (inert gas) according to the standard method. A high degree of whiteness which is very fast to light and washing is shown by the polyester filament. Comparable effects are obtainable with the compounds of formulae XXXII, XLVII, XLVIII, XLIX, L and LIII.

Application Example E

Polyamide 6 ("Grilon") granules are powdered in a mixer with 0.01–0.05% of their weight of the compound of formula XXXI. The batch is conveyed into a melt spinning machine, where it is melted under nitrogen for 30 minutes at about 300°, stirred for 15 minutes at this temperature, raised to the spinning temperature, 285°, and extruded as monofilament at 3–5 atmospheres excess pressure (nitrogen). In daylight the monofils fluoresce with an intense violet shade. They have an appreciably whiter appearance than unbrightened material and the effect is very fast to light.

If the compound of formula XXXI is replaced by one of the compounds of formulae XXVIII, XXX, XL, XLI, XLIII, XLVI, XLVIII, XLIX, LII, or LIII, similar white effects are obtained.

If polyester or polypropylene is processed in place of polyamide at spinning temperatures of 290° or 260° respectively, monofilaments of a higher degree of whiteness compared with unbrightened material are obtained.

Application Example F

A mixture of 1000 parts of caprolactam, 30 parts of water and 0.8 parts of the optical brightener of formula XXXIV is reacted in an autoclave with stirring for 4 hours at 240° under pressure and then for 1 hour with the pressure released. The resulting polyamide melt is extruded through a slot die, chilled in water, cut into chips and dried. Compared with identical polyamide chips without the brightener additive, they show greatly superior whiteness which is very fast to light.

The compounds of formulae XXVIII, XXX, XXXI, XL, XLI, XLIII, and XLVI can also be applied by this method.

Application Example G

In a mixer 200 parts of polypropylene granules are powdered with 0.04 parts of the compound of formula XXVIII. The batch is worked on a three-roll mill at 140°–220°, then it is either extrusion moulded as panelling or regranulated and injection moulded in the desired shape. The moulded articles have a substantially higher degree of whiteness than comparable articles without an incorporated brightener.

In place of the aforesaid compound, one of those of formulae XXXI, XXXIII, XXXIV or XLVI can be used to give comparable white effects.

Low-density or high-density polyethylene or another polyolefin can be processed in accordance with this Example in place of polypropylene.

Application Example H

100 Parts of polyester granules are powdered with 0.02 parts of the compound of formula XLVIII in a mixer and injection moulded. The moulded articles are of superior appearance to articles without a brightener additive.

If the polyester granules in this Example are replaced by other granulated material, e.g. polyamide, polystyrene, polyethylene or cellulose acetate, comparable white effects are shown by the final mouldings. The same applies when one of the compounds of formulae XXXVII or XL is used in place of the stated compound.

Application Example I

Polyvinyl chloride moulding material consisting of 65 parts of polyvinyl chloride and 35 parts of a plasticizer, e.g., dioctyl phthalate, is given additions of 0.01–0.05 parts of one of the compounds of formula XXXIII or XXXIV and 2 percent (relative to the polymer) of a stabiliser. When thoroughly mixed the material is worked on a roll mill for 3–6 minutes at 165°–185° and then extruded as film. If opaque film is desired, 2.5 percent titanium dioxide is incorporated in the material with the other additives. The films are superior in appearance to comparative films containing no optical brightener.

Application Example K

A stock solution of 10 parts of polyacrylonitrile, 80 parts of dimethyl formamide and 10 parts of the compound of formula XL is prepared. It is added to a normal polyacrylonitrile spinning solution in an amount equivalent to a concentration of 0.25 percent brightening agent in the spun filament. The solution is spun under normal conditions and the filament bleached in a sodium chloride bath. An extremely good white effect is obtained compared with unbrightened filament.

EXAMPLE 23 [process e)]

40 Parts of the bis-phenylhydrazone oxime derivative of formula

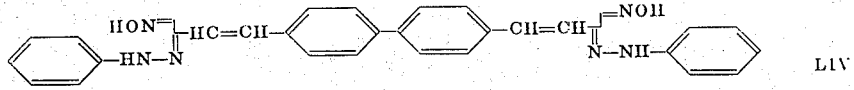

LIV is suspended in 200 parts of water-free dimethylformamide and 50 parts of pyridine and 50 parts of freshly distilled acetic anhydride are successively added. The orange suspension is heated for two hours at 80°, whereupon a solution is practically formed, and stirred for a further hour at this temperature. The mixture is then raised to 100° for a further two hours and then allowed to cool overnight to yield a brown-yellow product which, after recrystallisation from o-dichlorobenzene provides bright yellow crystals, m.p. 223°–225°C, which fluoresce with a violet shade in o-dichlorobenzene solution. The product is of formula XXVIII, above.

The bis-phenylhydrazone oxime derivative, employed as starting material, may be produced as follows:

250 Parts of 20% potassium hydroxide solution are cooled to −7° and mixed, portionwise, over 15 minutes, with 26 parts of isonitrosoacetone. To the resulting yellow solution is added, all at once, at 0°, a solution of 32 parts of 4,4'-bisformylbisphenyl in 120 parts of dimethylformamide. The resulting red-orange suspension is stirred at 0° for 40 minutes and the resulting clear, red solution, together with 100 ml of concentrated hydrochloric acid, is added, with vigorous stirring to a mixture of 260 parts of ice and 100 parts of water at such a rate that the pH of the mixture is maintained between 3 and 5 and the temperature does not exceed 5°. The yellow precipitate is filtered and dried under vacuum at 60°. The resulting yellow-brown product of formula

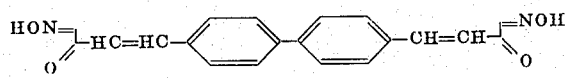

LV which cannot satisfactorily be recrystallised, is, without further purification, added, portionwise and with stirring, at 20°, to a mixture of 35 parts of phenylhydrazine, 175 parts of dimethyl formamide, 65 parts of acetic acid and 65 parts of water. The mixture is heated at 40° on a water bath for 30 minutes and the resulting brown yellow bis-phenylhydrazone oxime derivative of formula LIV is filtered off.

EXAMPLE 24 [process e)]

A suspension of 20 parts of the bis-triazole-N-oxide derivative of formula

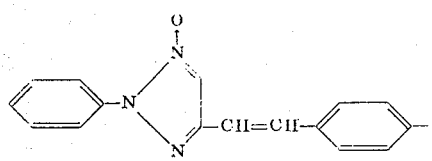

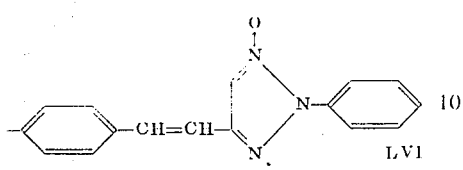

in 200 parts of glacial acetic acid is mixed with 10 parts of chlorobenzene and then 25 parts of zinc dust and the resulting mixture is heated to reflux. When no further N-oxide can be detected in a thin layer chromatogram, the mixture is cooled and the resulting yellow crystals, together with excess zinc are filtered off and recrystallised from o-dichlorobenzene, to obtain bright yellow crystals of the compound of formula XXVIII, above, m.p. 223°–225°C.

The bis-triazole-N-oxide derivative of formula LVI, employed as starting material, may be produced as follows:

42 parts of the bis-phenylhydrazone oxime derivative of formula LIV dissolved, with heating at 90°, in 1550 parts of pyridine. To the resulting dark-brown solution is added, dropwise, over 45 minutes, a solution of 56 parts of copper sulphate pentahydrate in 59 parts of pyridine and 118 parts of water. The mixture is stirred at 95°–100° for a further 2 ½ hours, the excess pyridine then distilled off in vacuo, and the mixture allowed to cool to room temperature. The precipitate is filtered off, washed with 500 parts of dioxane and dried at 70° in vacuo. The product is recrystallized from dimethylformamide to obtain the compound of formula LVI.

What is claimed is:

1. A compound of the formula

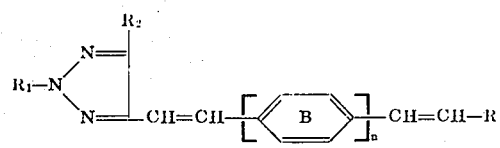

in which
R is substituted or unsubstituted and is phenyl or biphenyl, or a radical of formula II,

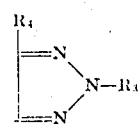

$R_1$ and $R_3$, which may be the same or different, are substituted or unsubstituted and are alkyl of 1 to 6 carbon atoms, phenyl or biphenyl, $R_2$ and $R_4$, which may be the same or different, are hydrogen, chlorine, substituted or unsubstituted alkyl of 1 to 6 carbon atoms, —CN, —CONH$_2$, —COOR$_5$, in which $R_5$ is hydrogen or unsubstituted or substituted alkyl of 1 to 6 carbon atoms, or —NH—CO—R$_6$ in which $R_6$ is substituted or unsubstituted alkyl of 1 to 6 carbon atoms, $n$ is 1 to 6, and the ring(s) B may be unsubstituted or substituted,
any substituent on a ring B or on a substituted phenyl or biphenyl is alkyl or alkoxy of 1 to 6 carbon atoms; phenyl sulphonyl; methylphenylsulphonyl; chlorophenylsulphonyl; phenyl or phenoxy, either of which may be substituted by halogen or alkyl or alkoxy of 1 to 6 carbon atoms; halo; cyano; carboxyl; sulphonic acid; alkyl sulphonyl of 1 to 6 carbon atoms; carboxylic acid amide or ester; or sulphonic acid amide or ester and any substituent on a substituted alkyl is alkoxy of 1 to 6 carbon atoms, amino or halo, provided that $n$ is other than 1, when R signifies a radical of formula II stated above.

2. A compound of claim 1 of the formula

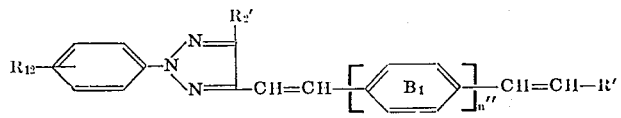

in which
R' signifies a radical of formula IIa,

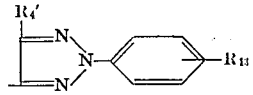

or of formula XXVII,

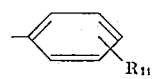

$R_2'$ and $R_4'$, which may be the same or different, are hydrogen, chlorine, or methyl, $R_{12}$ and $R_{13}$, which may be the same or different, are hydrogen or ortho- or paracyano, $R_{14}$ is chlorine, -CONH$_2$, para-phenyl, or an ortho- or paracyano group, and $n''$ is 1 to 4, and, when $n''$ signifies 1, the ring $B_1$ may be substituted by a cyano radical, and, when $n''$ signifies other than 1, each ring $B_1$ which is directly bonded to an ethenyl group may be substituted by a cyano group in a position ortho to the respective ethenyl group, provided that when R' signifies a radical of formula IIa, $n''$ is other than 1 and that when R' signifies a radical of formula XXVII, $n''$ is other than 4.

3. A compound of claim 2 which is of formula

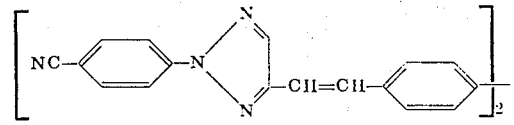

4. A compound of claim 2 which is of formula

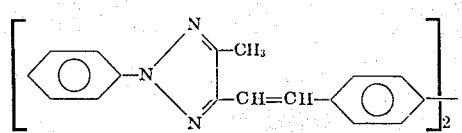

5. A compound of claim 2 which is of formula

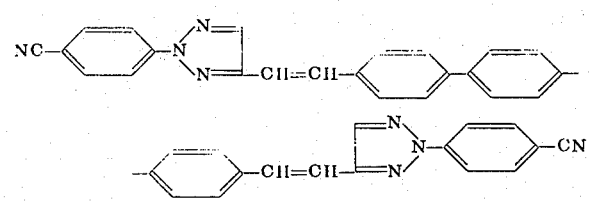

6. A compound of claim 2 which is of formula

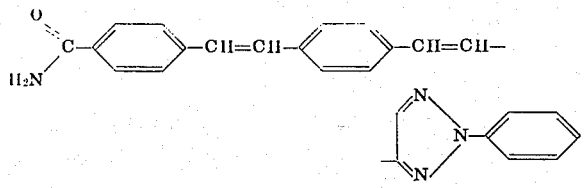

7. A compound of claim 1 which is of formula

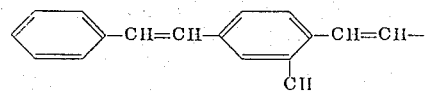
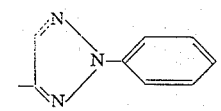

8. A compound of claim 2 which is of formula

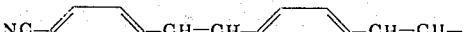
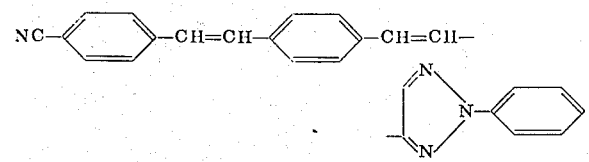

9. A compound according to claim 1 wherein $n$ is 1.
10. A compound according to claim 1 wherein $n$ is 2.
11. A compound according to claim 10 wherein any substituent on a ring B is halo, alkyl of 1 to 6 carbon atoms, carboxylic acid, sulphonic acid, carboxylic acid amide or ester, sulphonic acid amide or ester, phenyl sulphonyl or alkyl sulphonyl of 1 to 6 carbon atoms.
12. A compound according to claim 2 wherein $n''$ is 1.
13. A compound according to claim 2 wherein $n''$ is other than 1.
14. A compound according to claim 11 wherein $R_1$ and $R_3$ are, independently, unsubstituted alkyl of 1 to 6 carbon atoms or an aryl radical which is selected from the group consisting of phenyl and diphenyl and which may be substituted by substituents described for ring B.
15. A compound according to claim 14 wherein $R_1$ and $R_3$ are substituted phenyl.

* * * * *